United States Patent
Schrock et al.

(10) Patent No.: US 9,368,968 B2
(45) Date of Patent: Jun. 14, 2016

(54) RESPONDING TO LOCAL GRID EVENTS AND DISTRIBUTED GRID EVENTS

(71) Applicant: Younicos, Inc., Kyle, TX (US)

(72) Inventors: Eric Schrock, Mountain City, TX (US); Richard Thomas Jennings, San Antonio, TX (US)

(73) Assignee: YOUNICOS, INC., Kyle, TX (US)

( * ) Notice: Subject to any disclaimer, the term of this patent is extended or adjusted under 35 U.S.C. 154(b) by 677 days.

(21) Appl. No.: 13/729,801

(22) Filed: Dec. 28, 2012

(65) Prior Publication Data

US 2014/0183961 A1 Jul. 3, 2014

(51) Int. Cl.
*H02J 3/00* (2006.01)
*H02J 3/28* (2006.01)
*H02J 3/32* (2006.01)
*H02J 3/06* (2006.01)

(52) U.S. Cl.
CPC ... *H02J 3/28* (2013.01); *H02J 3/32* (2013.01); *H02J 3/06* (2013.01); *H02J 2003/001* (2013.01)

(58) Field of Classification Search
CPC ...................................... H02J 3/28; H02J 3/32
USPC .............................................. 307/44, 48, 102
See application file for complete search history.

(56) References Cited

U.S. PATENT DOCUMENTS

| | | |
|---|---|---|
| 5,274,571 A | 12/1993 | Hesse et al. |
| 5,369,353 A | 11/1994 | Erdman |
| 5,563,802 A | 10/1996 | Plahn et al. |
| 5,710,501 A | 1/1998 | Van Phuoc et al. |
| 6,522,031 B2 | 2/2003 | Provanzana et al. |
| 6,580,977 B2 | 6/2003 | Ding et al. |
| 6,674,265 B2 | 1/2004 | Yoshida et al. |
| 6,747,370 B2 | 6/2004 | Abe |
| 6,858,953 B2 | 2/2005 | Stahlkopf |
| 6,900,556 B2 | 5/2005 | Provanzana et al. |
| 7,002,260 B2 | 2/2006 | Stahlkopf |
| 7,227,275 B2 | 6/2007 | Hennessy et al. |
| 7,265,456 B2 | 9/2007 | Hennessy |
| 7,298,059 B2 | 11/2007 | Delmerico et al. |

(Continued)

FOREIGN PATENT DOCUMENTS

| | | |
|---|---|---|
| EP | 1122856 A2 | 8/2001 |
| WO | WO 2009/136975 | 11/2009 |

(Continued)

OTHER PUBLICATIONS

Muhammad Khalid et al., "Model Predictive Control Based Efficient Operation of Battery Energy Storage System for Primary Frequency Control," Proceedings of the 11th International Conference on Control, Automation, Robotics and Vision (ICARCV 2010), Dec. 2010, pp. 2248-2252.

(Continued)

*Primary Examiner* — Adi Amrany
(74) *Attorney, Agent, or Firm* — Foley & Lardner LLP (57) ABSTRACT

A control system for an energy storage device is coupled to sensors on an electrical grid. The control system is configured to receive a measurement from each of the sensors. The control system determines, based on the received measurements, whether a grid event is a local event or a distributed event. The control system selects a response mode for controlling the energy storage device based on whether the grid event is determined to be a local event or a distributed event.

17 Claims, 4 Drawing Sheets

(56) References Cited

U.S. PATENT DOCUMENTS

| | | | |
|---|---|---|---|
| 7,353,083 B2 | 4/2008 | Hennessy | |
| 7,389,189 B2 | 6/2008 | Williams et al. | |
| 7,432,611 B2 | 10/2008 | Stahlkopf | |
| 7,609,158 B2 | 10/2009 | Banting et al. | |
| 7,613,548 B2 | 11/2009 | Cardinal et al. | |
| 7,622,816 B2 | 11/2009 | Stahlkopf | |
| 7,679,215 B2 | 3/2010 | Delmerico et al. | |
| 7,826,908 B2 | 11/2010 | Cheng et al. | |
| 7,839,027 B2 * | 11/2010 | Shelton | H02J 3/32 307/102 |
| 7,840,313 B2 | 11/2010 | Horio et al. | |
| 7,890,217 B2 | 2/2011 | Cardinal et al. | |
| 7,908,036 B2 | 3/2011 | Kirchner et al. | |
| 7,941,246 B2 | 5/2011 | Miller et al. | |
| 7,952,232 B2 | 5/2011 | Burra et al. | |
| 8,008,808 B2 | 8/2011 | Seeker et al. | |
| 8,116,915 B2 | 2/2012 | Kempton | |
| 8,155,898 B2 | 4/2012 | Krein et al. | |
| 8,159,186 B2 | 4/2012 | Iida et al. | |
| 8,159,188 B2 | 4/2012 | Anderson | |
| 8,185,249 B2 | 5/2012 | Kirchner et al. | |
| 8,222,765 B2 | 7/2012 | Collins et al. | |
| 8,237,301 B2 | 8/2012 | Delmerico et al. | |
| 8,277,964 B2 | 10/2012 | Hennessy | |
| 8,301,311 B2 | 10/2012 | Nelson | |
| 8,335,547 B2 | 12/2012 | Otterson | |
| 8,338,987 B2 | 12/2012 | O'Brien et al. | |
| 8,344,550 B2 | 1/2013 | Delmerico et al. | |
| 8,373,312 B2 | 2/2013 | O'Brien et al. | |
| 8,400,112 B2 | 3/2013 | Anderson | |
| 8,452,461 B2 | 5/2013 | Sawyer et al. | |
| 8,471,406 B2 | 6/2013 | Patel et al. | |
| 8,504,214 B2 * | 8/2013 | Genc et al. | 700/292 |
| 8,532,834 B2 | 9/2013 | Delong et al. | |
| 8,914,158 B2 * | 12/2014 | Geinzer | H02J 3/32 700/295 |
| 2004/0207266 A1 | 10/2004 | Abel et al. | |
| 2006/0195229 A1 | 8/2006 | Bell et al. | |
| 2008/0167756 A1 | 7/2008 | Golden et al. | |
| 2008/0224541 A1 | 9/2008 | Fukuhara | |
| 2009/0184835 A1 | 7/2009 | Deaver et al. | |
| 2010/0057267 A1 | 3/2010 | Liu et al. | |
| 2010/0145533 A1 | 6/2010 | Cardinal et al. | |
| 2010/0213925 A1 * | 8/2010 | Teodorescu et al. | 324/76.78 |
| 2010/0295304 A1 * | 11/2010 | Rowan et al. | 290/44 |
| 2011/0001318 A1 | 1/2011 | Nelson | |
| 2011/0082598 A1 | 4/2011 | Boretto et al. | |
| 2011/0156391 A1 | 6/2011 | Kirchner et al. | |
| 2011/0187106 A1 | 8/2011 | Ichinose et al. | |
| 2011/0221276 A1 | 9/2011 | Geinzer et al. | |
| 2012/0046891 A1 | 2/2012 | Yaney et al. | |
| 2012/0056588 A1 | 3/2012 | Cai et al. | |
| 2012/0123604 A1 | 5/2012 | Littrell | |
| 2012/0173032 A1 * | 7/2012 | Pamulaparthy et al. | 700/295 |
| 2012/0248873 A1 | 10/2012 | Oudalov et al. | |
| 2012/0292904 A1 * | 11/2012 | Tarnowski | 290/44 |
| 2012/0316688 A1 * | 12/2012 | Boardman et al. | 700/291 |
| 2013/0064178 A1 * | 3/2013 | CS et al. | 370/328 |
| 2013/0249215 A1 | 9/2013 | Egedal et al. | |
| 2013/0257351 A1 | 10/2013 | Nishibayashi et al. | |
| 2013/0278203 A1 | 10/2013 | Coe et al. | |
| 2014/0070617 A1 * | 3/2014 | Detmers et al. | 307/64 |
| 2014/0070756 A1 * | 3/2014 | Kearns et al. | 320/101 |

FOREIGN PATENT DOCUMENTS

| | | |
|---|---|---|
| WO | WO2009136975 A9 | 11/2009 |
| WO | WO2010053872 A1 | 5/2010 |
| WO | WO2011026901 A1 | 3/2011 |
| WO | WO2011112255 A2 | 9/2011 |
| WO | WO2012-062921 | 5/2012 |
| WO | WO 2012-062921 | 5/2012 |
| WO | WO 2013/068149 A2 | 5/2013 |

OTHER PUBLICATIONS

Massoud Arnin et al., "The Electric Power Grid: Today and Tomorrow," MRS Bulletin, vol. 33, Apr. 2008, pp. 399-407.

International Search Report and Written Opinion dated Apr. 7, 2014; 13 pages.

PCT Notification Concerning Transmittal of International Preliminary Report on Patentability dated Jun. 30, 2015 for PCT/US2013/078069, 10 pages.

* cited by examiner

RESPONDING TO LOCAL GRID EVENTS AND DISTRIBUTED GRID EVENTS

TECHNICAL FIELD

This disclosure relates generally to managing power flows, and more particularly, to managing energy delivery in a power grid in response to different types of events.

BACKGROUND

Modern power systems must deliver energy efficiently and reliably. This is because people depend heavily on electricity. Electricity powers many devices such as computers, cell phones, lights, appliances, and machines, all of which integral to the lives of many citizens. As society's demand for energy increases, power system infrastructures need to improve to provide the increasingly important resource of electricity in both an efficient and reliable manner.

Large power plants typically generate electric power and send the power through a power grid distribution system before the power reaches a target load. However, power systems may experience problematic events such as fluctuating power output from generators, significant changes in loads, or physical damage to the distribution infrastructure. To improve reliability of power delivery systems, the power delivery system should be able to adjust and adapt to such events.

SUMMARY

A control system for an energy storage device or devices is coupled to sensors on an electrical grid. The control system is configured to receive a measurement from each of the sensors. The control system determines, based on the received measurements, whether a grid event is a local event or a distributed event. The control system selects a response mode for controlling the energy storage device or devices based on whether the grid event is determined to be a local event or a distributed event.

In general, one aspect of the subject matter described in this specification can be embodied in methods that include the actions of receiving a measurement from each of a plurality of sensors coupled to an electrical grid, the electrical grid comprising a plurality of metering nodes at different geographic locations, each sensor being coupled to a metering node; determining, based on the received measurements, whether a grid event is a local event or a distributed event; and selecting a response mode for controlling an energy storage device coupled to the electrical grid based on whether the grid event is determined to be a local event or a distributed event. Other embodiments of this aspect include corresponding systems, apparatus, and computer programs, configured to perform the actions of the methods, encoded on computer storage devices. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

These and other embodiments can each optionally include one or more of the following features. The actions comprise determining that a first grid event is a local event, and in response, causing the energy storage device to inject or absorb active or reactive power at a first rate to compensate for the first grid event; and determining that a second grid event is a distributed event, and in response, cause the energy storage device to inject or absorb active or reactive power at a second rate greater than the first rate to compensate for the second grid event. Determining whether the grid event is a local event or a distributed event comprises counting a number of sensors reporting the grid event, and, if the number of sensors is greater than a threshold number of sensors, determining that the grid event is a distributed event. The grid comprises first and second levels of grid components and a first plurality of sensors are located in the first level of grid components and a second plurality of sensors are located in the second level of grid components, and wherein determining whether the grid event is a local event or a distributed event comprises counting a first number of sensors reporting the grid event in the first level and a second number of sensors reporting the grid event in the second level and determining whether the grid event is a local event or a distributed event based on the first number of sensors and the second number of sensors. Determining whether the grid event is a local event or a distributed event based on the first number of sensors and the second number of sensors comprises: determining a difference between the first number of sensors and the second number of sensors; and if the difference is greater than a threshold difference, determining that the grid event is a local event, and if the difference is less than or equal to the threshold difference, determining that the grid event is a distributed event. Determining whether the grid event is a local event or a distributed event comprises: receiving location information from each of the sensors; and determining whether the grid event is a local event or a distributed event based on the location information. Determining whether the grid event is a local event or a distributed event based on the location information comprises: counting a first number of sensors of a first location reporting the grid event; counting a second number of sensors of a second location reporting the grid event; determining a difference between the first number of sensors and the second number of sensors; and determining that the grid event is a local event if the difference is less than or equal to a threshold difference and determining that the grid event is a distributed event if the difference is greater than the threshold difference. The actions include determining that the grid event has occurred by determining that at least a first sensor has reported a reduction in a measured electrical parameter of the grid. The actions include determining that at least a first sensor has reported the reduction in the measured electrical parameter comprises determining that the first sensor has reported the reduction in the measured electrical parameter for at least a threshold period of time.

Particular implementations of the control system can provide one or more of the following advantages: the control system can more aggressively respond to distributed grid events, and thereby provide better service to consumers on the grid; the control system can respond less aggressively to local grid events, and thereby reducing unintended effects on the grid; and the control system can determine whether a grid event is local or distributed using various data received from the sensors, thereby resulting in a more reliable determination of whether the grid event is local or distributed.

The details of one or more disclosed implementations are set forth in the accompanying drawings and the description below. Other features, aspects, and advantages will become apparent from the description, the drawings and the claims.

DETAILED DESCRIPTION

Figure 1:
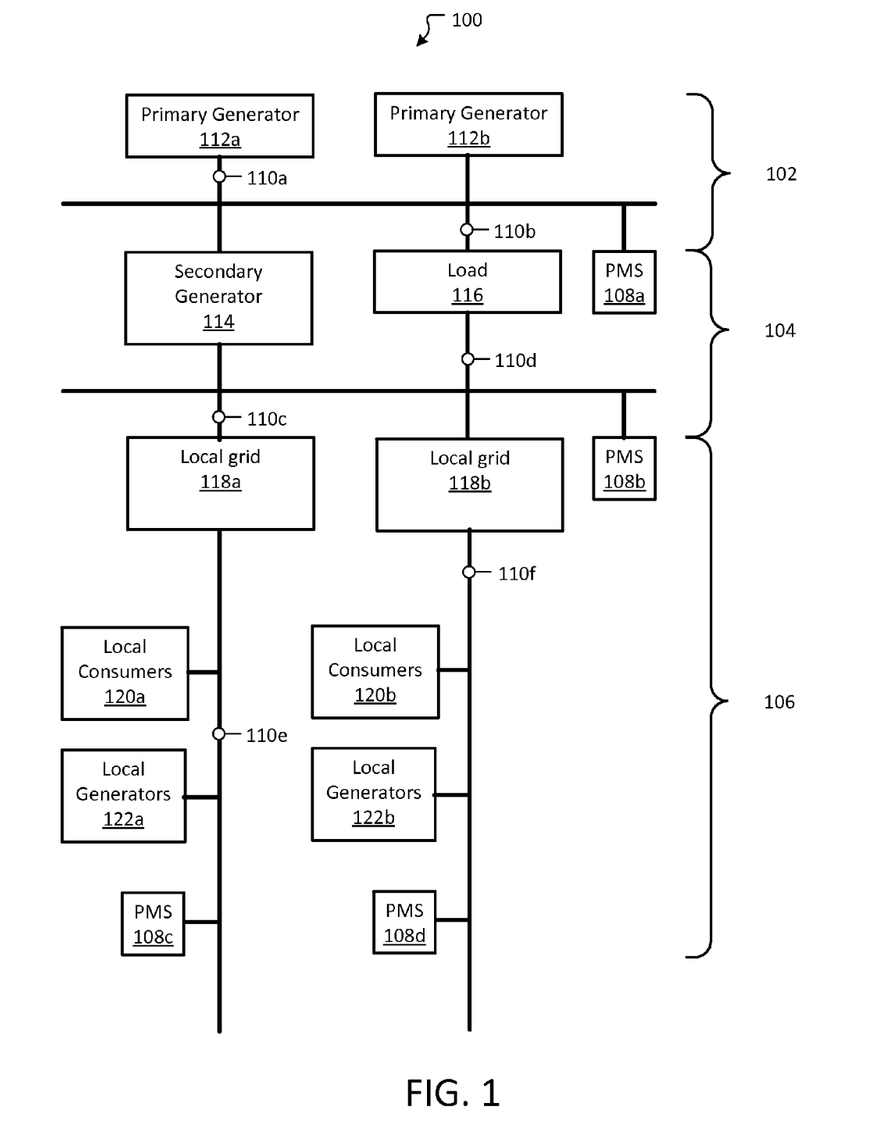
FIG. 1 is a block diagram of an example electricity grid.

FIG. 1 is a block diagram of an example electricity grid 100. The grid is organized into a hierarchy of levels, including a primary level 102, a secondary level 104, and a local level 106. Power management systems 108a-d are coupled to the grid and configured to receive signals from sensors 110a-f and inject or absorb real and reactive power from energy storage devices to compensate for grid events.

The primary level of the grid includes primary generators 112a-b. The primary generators can be, for example, coal burning plants, nuclear power plants, wind farms, solar arrays, and hydro-electric plants. The primary level of the grid is coupled to the secondary level of the grid. One or more transformers can step down the voltage between the primary level and the secondary level.

The second level includes a secondary generator 114 and, in some implementations, a load. The secondary generator can be, for example, a coal burning plant that produces less power than the primary generators. The load can be, for example, a consumer load.

The second level is coupled to the local level. One or more transformers can step down the voltage between the secondary level and the local level. The local level can include local grids 118a-b that include local consumers 120a-b and local generators 122a-b. The local consumers can be, for example, residential consumers, business consumers, and industrial consumers.

The sensors are each coupled to the grid at respective metering nodes that are geographically distributed. The sensors can be positioned in various levels of the grid, and the sensors can be positioned in various branches of local grids. Some of the sensors can be positioned near particular loads to monitor those loads. Some of the sensors can be positioned near or at particular generators to monitor those generators.

The sensors can measure, for example, one or more of current, voltage, frequency, phase, resistance, and temperature at the metering nodes. Each sensor is configured to report, e.g., periodically or in response to a query, one or more measurements to one or more of the power management systems. The sensors can report to the power management systems by a data network, e.g., over the power lines or by communication via cellular towers on the Internet or by existing smart grid infrastructure. The power management systems are configured to receive the measurements and determine a response mode for responding to grid events.

Grid events can include, for example, changes in current, voltage, phase angles, harmonics, and frequency. A power management system can determine that a grid event occurs, for example, when the frequency of the power on the grid drops by a certain amount over a certain time period or significant phase angle differences exist at dispersed locations on the power system. A response mode for a power management system can determine, e.g., whether the power management system injects or absorbs active or reactive power from an energy storage device or devices and the rate at which it injects or absorbs power from the energy storage device or devices.

A power management system can determine the rate at which it injects or absorbs power from an energy storage device or devices based on whether a grid event is a local event or a distributed event. In some implementations, the power management system injects or absorbs power from the energy storage device or devices at a first rate in response to a local event and at a second rate greater than the first rate in response to a distributed event.

Figure 2:
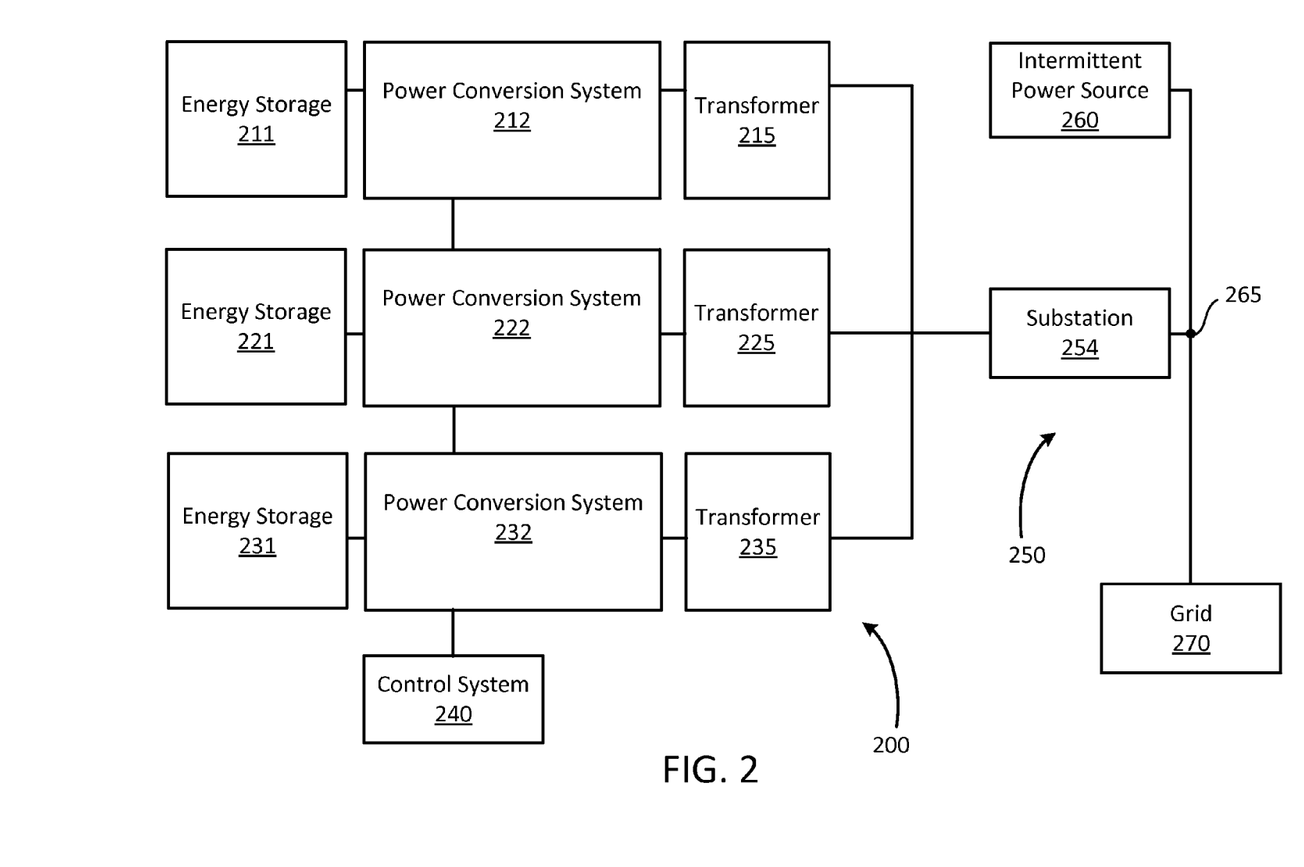
FIG. 2 is a block diagram of an example power management system (PMS) coupled to a distribution network.

FIG. 2 is a block diagram of an example power management system (PMS) 200 coupled to a distribution network 250. The power management system includes energy storage arrays 211, 221, and 231. The energy storage arrays are each coupled to a respective power conversion system 212, 222, and 232, and the power conversion systems are each coupled to a respective transformer 215, 225, and 235. The power conversion systems can be, for example, bidirectional inverters. In some implementations, the energy storage arrays include batteries coupled in series, in parallel, or a series-parallel configuration. In other implementations, the energy storage arrays may include, for example, capacitors, flywheels, super-conducting magnetics, or combinations thereof.

The transformers are coupled to a substation 254 that is coupled to an intermittent power source 260 and a grid 270, e.g., the grid 100 of FIG. 1. The intermittent power source can be, for example, a wind farm or a solar power generator. In operation, the power management system provides one or more support services to the intermittent power source and/or one or more ancillary services to the grid.

The power management system includes a control system 140 operatively linked to each of the inverters through a communication interface. The control system provides the inverters control signals and/or data via the communication interface, including, for example, target active and reactive power settings, distribution network status information, and activate/standby control commands. Distribution network status information includes, for example, voltage, current, active power, reactive power, and frequency information derived, e.g., from one or more sensors coupled to the grid. Based on this information, the control system can control the operation of each power conversion system so that the power management system appears to the distribution network as a single high capacity system.

The control system issues target active power settings ("P commands") and target reactive power settings ("Q commands") to each of the inverters based on system performance requirements. For example, in a frequency regulation mode, the control system may issue a P command to increase the amount of active power transferred from an energy storage array to the distribution network in response to detecting a drop in frequency on the distribution network.

The control system issues target frequency harmonics settings to generate out of phase harmonics used to cancel out undesired frequencies. For example, the fundamental frequency of the grid may be 50 or 60 Hz. If the control system determines that an undesirable 10 Hz oscillation is present on the grid, the control system can cause the energy storage system to generate an out of phase signal to cancel out the undesired frequency.

Further, in a voltage regulation mode, the control system can issue a Q command to increase the amount of reactive power transferred between an energy storage array and the distribution network in response to detecting a voltage drop. Moreover, in a VAR regulation mode, the control system can issue a Q command to adjust the amount of reactive power transferred between an energy storage array and the distribution network in response to an out-of-limit condition.

The control system can issue P and Q commands as necessary to manage power transferred at a point of interconnection (POI) 265 between the intermittent power source and the grid. For example, the control system can issue a P command to absorb power generated by the intermittent power source to avoid violating a positive ramp-rate limit during a sudden increase in power output by the intermittent power source. Similarly, the control system can issue a P command to provide power to distribution network 150 upon a sudden drop in power output by the intermittent power source to avoid violating a negative ramp-rate limit.

Figure 3:
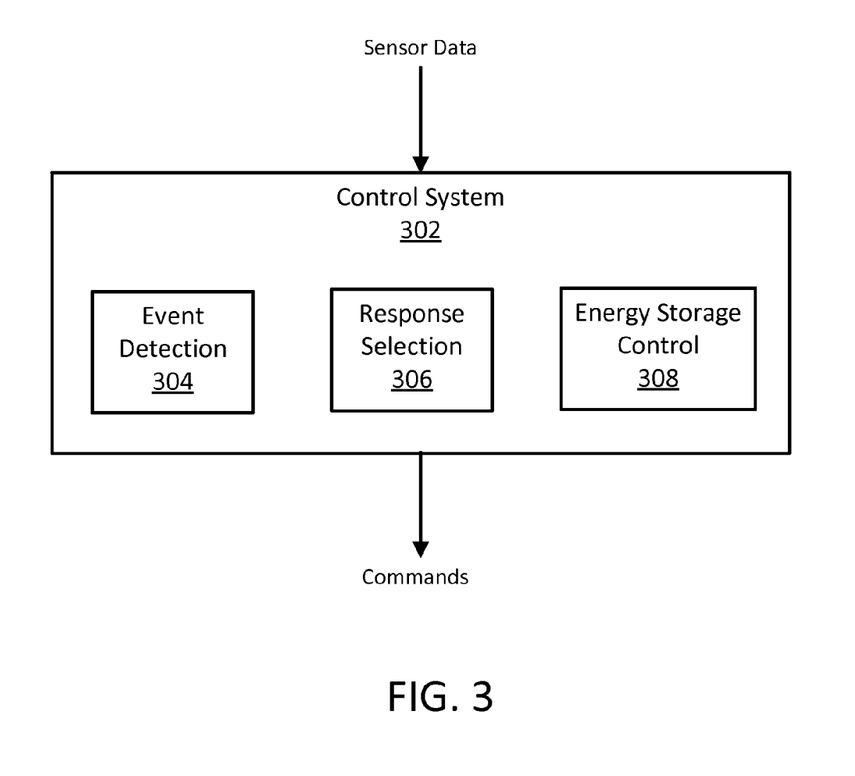
FIG. 3 is a block diagram of an example control system for one or more power management systems.

FIG. 3 is a block diagram of an example control system 302 for one or more power management systems. For example, the control system can be the control system 240 of FIG. 2. The control system receives at least sensor data, e.g., data from the sensors 110a-f of FIG. 1, and sends commands, e.g., P and Q commands to power conversion systems as described above with reference to FIG. 2. The control system can be implemented, for example, on one or more computers executing one or more modules of executable instructions.

The control system includes an event detection module 304, a response selection module 306, and an energy storage control module 308. The event detection module analyzes the sensor data to determine whether a grid event has occurred. In some implementations, the event detection module determines that a grid event has occurred when a measured grid parameter changes by a certain amount for a certain period of time. For example, the event detection module can determine that a grid event has occurred when a measured frequency on the grid drops below a threshold frequency for a certain amount of time.

In response to determining that a grid event has occurred, the response selection module selects a response mode for controlling one or more energy storage devices. The response selection module determines whether the grid event is a local event or a distributed event.

In some implementations, a local event is an event reported by a threshold number of sensors or less, and a distributed event is a grid event reported by a number of sensors greater than the threshold number. For example, suppose the threshold number of sensors is two. If one or two sensors measure a change in phase angles on the grid, the response selection module will determine that the grid event is a local event. If more than two sensors measure a change in phase angles on the grid, the response selection module will determine that the grid event is a distributed event, the response selection module will determine that the grid event is a local event.

In some implementations, the response selection module uses location information to determine whether an event is local or distributed. For example, the response selection module may have access to stored information indicating the location of the sensors, or the sensors may report location information. The response selection module can then determine that a local event is a grid event reported by sensors with a certain area, e.g., one of the grid levels described above with respect to FIG. 1, and the response selection module can determine that a distributed event is a grid event reported by sensors in more than one area, or more than a threshold number of areas.

In some implementations, the response selection module uses time synchronized sensor data and geographic data and grid architecture data to generate local and distributed control response. For example the response selection module can analyze time coordinated voltage, frequency and phase over a moving window of time and determine if a time synchronized distributed response is needed.

In some implementations, the response selection module uses hierarchical information as location information rather than geographical location information. For example, consider the example grid illustrated in FIG. 1. Sensors 110a and 110b are located in the primary level of the grid. The response selection module can determine that a grid event reported by one or both of sensors 110a and 110b is a distributed event. Sensors 110e and 110f are located in the local level of the grid. The response selection module can determine that a grid event reported by one of sensors 110a and 110b is a local event.

The response selection module, after determining whether a grid event is a local event or a distributed event, selects a response mode for controlling one or more energy storage devices. For example, the response mode can specify to inject or absorb power from an energy storage device at a certain rate, or to inject or absorb power from the energy storage device in a feedback loop using the rate of change of the frequency on the grid. The response mode can specify various parameters for injecting or absorbing power from an energy storage device, as is described further below with reference to FIG. 4.

The energy storage control module controls injection or absorption of power from one or more energy storage devices. The energy storage control module may apply one or more control algorithms to control the energy storage devices, and the control algorithms may use one or more of various factors, e.g., the measured power output of an intermittent power source, the rate of change or the power output of an intermittent power source, and the state of charge of the energy storage device. In response to detecting a grid event, the energy storage control module uses the selected response mode of the response selection module to control injecting or absorbing power from the energy storage devices.

Figure 4:
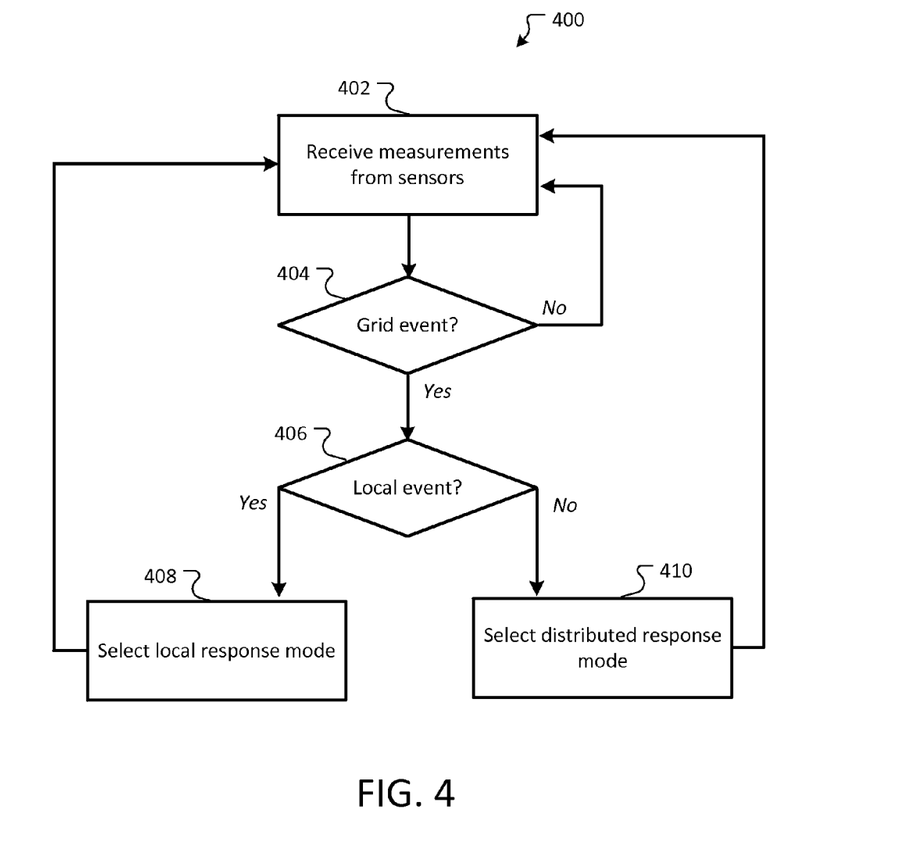
FIG. 4 is a flow diagram of an example process for controlling one or more energy storage devices in response to a grid event.

FIG. 4 is a flow diagram of an example process 400 for controlling one or more energy storage devices in response to a grid event. The process can be performed, for example, by one of the power management systems of FIG. 1, or by the control system 240 of FIG. 2. For purposes of illustration, the process will be described with respect to a system that performs the process.

The system receives a measurement from each of multiple sensors coupled to an electrical grid (402). The measurements can be time synchronized. In some implementations, the measurements include voltage and current magnitudes, phase angles, and frequencies, or combinations thereof. The electrical grid includes metering nodes at different geographic locations, and at least some of the sensors are coupled to metering nodes.

The system determines whether a grid event has occurred based on the measurements (404). For example, the system can determine that at least a first sensor has reported a reduction in a measured electrical parameter for at least a threshold period of time.

The system determines whether the grid event is a local event or a distributed event (406). For example, the system can determine whether the grid event is a local event or a distributed event by counting a number of sensors reporting the grid event, and, if the number of sensors is greater than a threshold number of sensors, determining that the grid event is a distributed event.

In some implementations, determining whether the grid event is a local event or a distributed event includes calculating a difference between a first phase angle at a first sensor and a second phase angle at a second sensor, and, if the difference exceeds a threshold, determining that the grid event is a distributed event. In some implementations, determining whether the grid event is a local event or a distributed event includes calculating historical inter-area power flows, and, if oscillations or a rate of change threshold is exceeded, determining that the grid event is a distributed event.

For example, the system can determine a first power flow from a first sensor to a second sensor and compare the first power flow with a recorded power flow from the first sensor to the second sensor. If the first power flow is oscillating more than a threshold oscillation amount from the recorded power flow or a rate of change of the power flow relative to the recorded power flow exceeds a rate of change threshold, the system can determine that the grid event is a distributed event.

In some implementations, the grid comprises first and second levels of grid components. The system determines whether the grid event is a local event or a distributed event by counting a first number of sensors reporting the grid event in the first level and a second number of sensors reporting the grid event in the second level and determining whether the grid event is a local event or a distributed event based on the first number of sensors and the second number of sensors. For example, the system can determine a difference between the first number of sensors and the second number of sensors, and if the difference is greater than a threshold difference, determine that the grid event is a local event, and if the difference is less than or equal to the threshold difference, determine that the grid event is a distributed event.

In some implementations, the system receives location information from each of the sensors and determines whether the grid event is a local event or a distributed event based on the location information. For example, the system can count a first number of sensors of a first location reporting the grid event and a second number of sensors of a second location reporting the grid event. The system can then determine a difference between the first number of sensors and the second number of sensors. The system determines that the grid event is a local event if the difference is less than or equal to a threshold difference, and the system determines that the grid event is a distributed event if the difference is greater than the threshold difference.

If the grid event is a local event, the system selects a local response mode (408). If the grid event is a distributed event, the system selects a distributed response mode (410). For example, the system can cause the energy storage devices to inject or absorb power at a first rate in the local response mode and a second rate, greater than the first rate, in the distributed response mode.

In some implementations, where the grid event is a frequency drop and the system determines that the grid event is a distributed event, the system causes the energy storage device to output a frequency response with a high gain in an effort to minimize the absolute value of the frequency deviation as controlled by the following equation:

$$\text{Frequency Response} = -\frac{1}{R}\left[\frac{Td}{Tg} + \left(1 - \frac{Td}{Tg}\right)(1 - e^{-TMRlead/Tg})\right] \times \text{(Frequency Deviation)} \quad \text{Equation 1}$$

Where $R$ = Traditional Droop Coefficient (Hz/MW)

$Tf$ = Lead Magnitude Coefficient $Tg$ = Lead Time Constant Coefficient $TMRlead$ = time value relative to the beginning of the frequency event Frequency Deviation = difference between the measured and nominal frequencies.

Alternatively the system can cause the energy storage device to output a frequency response in accordance with other various conventional control algorithms.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, e.g., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, or a combination of one or more of them.

The processes and logic flows described in this specification can be performed by one or more programmable processors executing one or more computer programs (also known as a program, software, software application, script, or code) to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system comprising:
an energy storage device coupled to an electrical grid;
a plurality of sensors coupled to the electrical grid, the electrical grid comprising a plurality of metering nodes at different geographic locations, each sensor being coupled to a metering node;
a control system coupled to the energy storage device and the sensors, wherein the control system is configured to:
receive a measurement from each of the sensors;
determine, based on the received measurement, whether a grid event is a local event or a distributed event; and
select a response mode for controlling the energy storage device based on whether the grid event is determined to be a local event or a distributed event;
wherein determining whether a grid event is a local event or a distributed event comprises calculating a difference between a first phase angle at a first sensor of the plurality of sensors and a second phase angle at a second sensor of the plurality of sensors, and, if the difference exceeds a threshold, determining that the grid event is a distributed event.

2. The system of claim 1, wherein the control system is configured to:
determine that a first grid event is a local event, and in response, cause the energy storage device to inject or absorb active power at a first rate to compensate for the first grid event; and
determine that a second grid event is a distributed event, and in response, cause the energy storage device to inject or absorb active power at a second rate greater than the first rate to compensate for the second grid event.

3. The system of claim 1, wherein determining whether the grid event is a local event or a distributed event further comprises counting a number of sensors reporting the grid event, and, if the number of sensors is greater than a threshold number of sensors, determining that the grid event is a distributed event.

4. The system of claim 1, wherein the system is configured to determine that the grid event has occurred by determining that at least a first sensor has reported a reduction in a measured electrical parameter of the grid.

5. The system of claim 4, wherein determining that at least a first sensor has reported the reduction in the measure electrical parameter comprises determining that the first sensor has reported the reduction in the measured electrical parameter for at least a threshold period of time.

6. The method of claim 4, wherein determining whether the grid event is a local event or a distributed event further comprises:
receiving location information from each of the sensors; and
determining whether the grid event is a local event or a distributed event based on the location information.

7. The method of claim 6, wherein determining whether the grid event is a local event or a distributed event based on the location information further comprises:
counting a first number of sensors of a first location reporting the grid event;
counting a second number of sensors of a second location reporting the grid event;
determining a difference between the first number of sensors and the second number of sensors; and
determining that the grid event is a local event if the difference is less than or equal to a threshold difference and determining that the grid event is a distributed event if the difference is greater than the threshold difference.

8. A system comprising:
an energy storage device coupled to an electrical grid;
a plurality of sensors coupled to the electrical grid, the electrical grid comprising a plurality of metering nodes at different geographic locations, each sensor being coupled to a metering node;
a control system coupled to the energy storage device and the sensors, wherein the control system is configured to:
receive a measurement from each of the sensors;
determine, based on the received measurement, whether a grid event is a local event or a distributed event; and
select a response mode for controlling the energy storage device based on whether the grid event is determined to be a local event or a distributed event;
wherein determining whether the grid event is a local event or a distributed event comprises:
determining a first power flow from a first sensor of the plurality of sensors to a second sensor of the plurality of sensors;
comparing the first power flow with a recorded power flow from the first sensor to the second sensor, and, if the first power flow is oscillating more than a threshold oscillation amount from the recorded power flow or a rate of change of the power flow relative to the recorded power flow exceeds a rate of change threshold, determine that the grid event is a distributed event.

9. A system comprising:
an energy storage device coupled to an electrical grid;
a plurality of sensors coupled to the electrical grid, the electrical grid comprising a plurality of metering nodes at different geographic locations, each sensor being coupled to a metering node;
a control system coupled to the energy storage device and the sensors, wherein the control system is configured to:
receive a measurement from each of the sensors;
determine, based on the received measurement, whether a grid event is a local event or a distributed event; and select a response mode for controlling the energy storage device based on whether the grid event is determined to be a local event or a distributed event;
wherein the grid comprises first and second levels of grid components and a first plurality of sensors are located in the first level of grid components and a second plurality of sensors are located in the second level of grid components, and wherein determining whether the grid event is a local event or a distributed event comprises counting a first number of sensors reporting the grid event in the first level and a second number of sensors reporting the grid event in the second level and determining whether the grid event is a local event or a distributed event based on the first number of sensors and the second number of sensors;
wherein determining whether the grid event is a local event or a distributed event based on the first number of sensors and the second number of sensors comprises:
determining a difference between the first number of sensors and the second number of sensors; and
if the difference is greater than a threshold difference, determining that the grid event is a local event, and if the difference is less than or equal to the threshold difference, determining that the grid event is a distributed event.

10. A system comprising:
an energy storage device coupled to an electrical grid;
a plurality of sensors coupled to the electrical grid, the electrical grid comprising a plurality of metering nodes at different geographic locations, each sensor being coupled to a metering node;
a control system coupled to the energy storage device and the sensors, wherein the control system is configured to:
receive a measurement from each of the sensors;
determine, based on the received measurement, whether a grid event is a local event or a distributed event; and
select a response mode for controlling the energy storage device based on whether the grid event is determined to be a local event or a distributed event;
wherein determining whether the grid event is a local event or a distributed event comprises:
receiving location information from each of the sensors;
counting a first number of sensors of a first location reporting the grid event;
counting a second number of sensors of a second location reporting the grid event;
determining a difference between the first number of sensors and the second number of sensors; and
determining that the grid event is a local event if the difference is less than or equal to a threshold difference and determining that the grid event is a distributed event if the difference is greater than the threshold difference.

11. A method comprising:
receiving a measurement from each of a plurality of sensors coupled to an electrical grid, the electrical grid comprising a plurality of metering nodes at different geographic locations, each sensor being coupled to a metering node;
determining, based on the received measurements, whether a grid event is a local event or a distributed event; and
selecting a response mode for controlling an energy storage device coupled to the electrical grid based on whether the grid event is determined to be a local event or a distributed event;
wherein determining whether a grid event is a local event or a distributed event comprises calculating a difference between a first phase angle at a first sensor of the plurality of sensors and a second phase angle at a second sensor of the plurality of sensors, and, if the difference exceeds a threshold, determining that the grid event is a distributed event.

12. The method of claim 11, comprising:
determining that a first grid event is a local event, and in response, causing the energy storage device to inject or absorb active or reactive power at a first rate to compensate for the first grid event; and
determine that a second grid event is a distributed event, and in response, cause the energy storage device to inject or absorb active or reactive power at a second rate greater than the first rate to compensate for the second grid event.

13. The method of claim 11, wherein determining whether the grid event is a local event or a distributed event further comprises counting a number of sensors reporting the grid event, and, if the number of sensors is greater than a threshold number of sensors, determining that the grid event is a distributed event.

14. The method of claim 11, wherein the grid comprises first and second levels of grid components and a first plurality of sensors are located in the first level of grid components and a second plurality of sensors are located in the second level of grid components, and wherein determining whether the grid event is a local event or a distributed event further comprises counting a first number of sensors reporting the grid event in the first level and a second number of sensors reporting the grid event in the second level and determining whether the grid event is a local event or a distributed event based on the first number of sensors and the second number of sensors.

15. The method of claim 14, wherein determining whether the grid event is a local event or a distributed event based on the first number of sensors and the second number of sensors comprises:
determining a difference between the first number of sensors and the second number of sensors; and
if the difference is greater than a threshold difference, determining that the grid event is a local event, and if the difference is less than or equal to the threshold difference, determining that the grid event is a distributed event.

16. The method of claim 11, comprising determining that the grid event has occurred by determining that at least a first sensor has reported a reduction in a measured electrical parameter of the grid.

17. The method of claim 16, wherein determining that at least a first sensor has reported the reduction in the measured electrical parameter comprises determining that the first sensor has reported the reduction in the measured electrical parameter for at least a threshold period of time.

* * * * *